Oct. 26, 1954     N. S. REYNOLDS     2,692,786
SEAL
Filed April 27, 1950
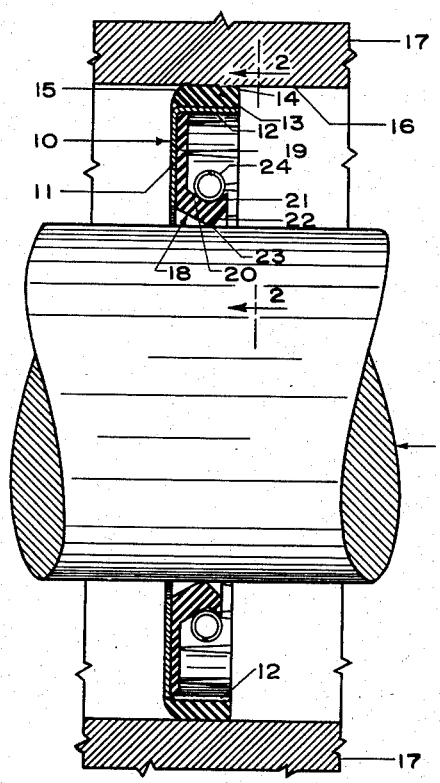
FIG.—1
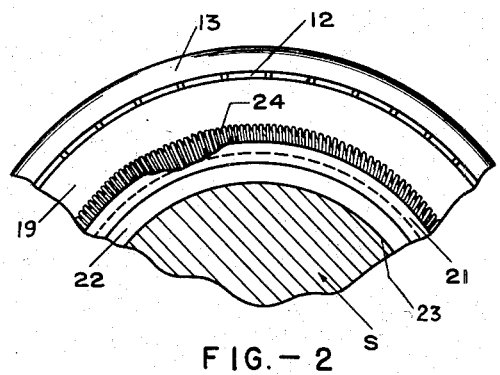
FIG.—2
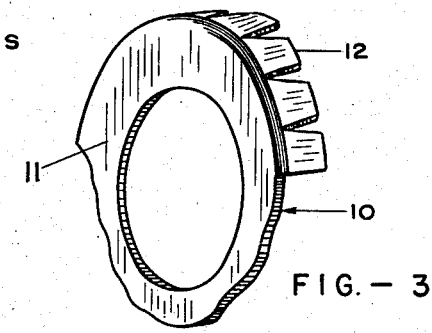
FIG.—3
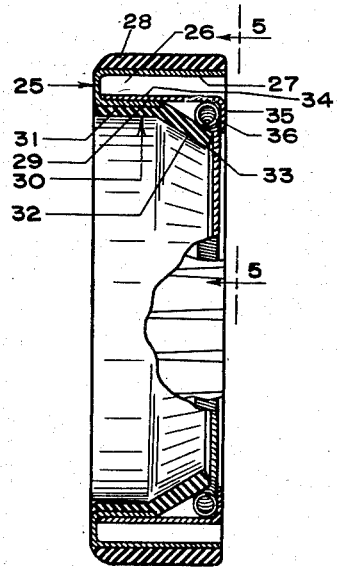
FIG.—4
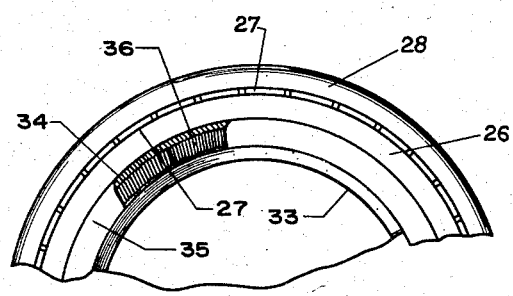
FIG.—5
*INVENTOR*
Noel S. Reynolds
BY
*Lamphere and Van Valkenburgh*
ATTORNEYS Patented Oct. 26, 1954

2,692,786

UNITED STATES PATENT OFFICE 2,692,786

SEAL

Noel S. Reynolds, St. Louis, Mo., assignor to National Motor Bearing Co., Inc., Redwood City, Calif., a corporation of California Application April 27, 1950, Serial No. 158,545

2 Claims. (Cl. 288—3)

This invention relates to seals and more particularly to an improved seal construction for mounting in a fixed support and sealing it with a rotating member.

One of the objects of my invention is to produce an improved seal which can be easily mounted in a housing member and when so mounted provide an efficient seal between it and a rotating member such as a shaft.

Another object is to produce an annular type of seal for a shaft which will be provided with improved peripheral structure enabling the seal to be easily installed by a "pressed in" operation and removed from a surrounding housing structure and when installed insuring an efficient sealing engagement with the housing for a long period of time.

Still another object is to produce an improved shaft seal in which peripheral axially extending spring fingers covered by a sealing material, such as rubber, synthetic rubber or the equivalent, is employed to mount the seal in a cylindrical housing surface.

A further object is to produce an improved seal embodying an annular metal support structure and rubber, or synthetic rubber adhered thereto and which will have the metal support structure so formed and the rubber or synthetic rubber so associated therewith that resilient backing will be given to the rubber or synthetic rubber for maintaining a sealing action between a housing and the seal.

A still further object is to provide in a shaft seal improved mounting means therefor comprising rubber or like material for engaging a support structure with resilient means as a backing for all the engaging surface of the rubber whereby the seal can be easily mounted and removed and yet efficient sealing with the support structure will at all times be present, notwithstanding a "set" condition of the rubber may occur.

Yet a further object is to produce an annular shaft seal having improved sealing lip construction for efficient cooperation with the shaft.

Other objects of my invention will become apparent from the following description taken in connection with the accompanying drawings showing two seal constructions embodying the invention.

In the drawings:

Figure 1 is a cross sectional view of a seal showing it in its mounted position cooperating with a shaft;

Figure 2 is a side view showing a part of the seal of Figure 1;

Figure 3 is a perspective view of a portion of the shell showing the spring fingers for producing a yieldable backing for the peripheral rubber body when molded thereon;

Figure 4 is a cross sectional view of another seal structure especially designed for the employment of a garter spring; and Figure 5 is a side view showing a part of the seal of Figure 4.

Referring to the drawings in detail and first to Figures 1 to 3 inclusive, the seal here shown has a cup-shaped shell 10 made from metal or other suitable material. This shell, as best seen in Figure 3, has a flat ring portion 11 arranged so as to lie in a plane which will be at right angles to the axis of the seal. From the outer periphery of this flat ring portion extend, in an axial direction, integrally attached fingers 12. In making the shell a flat annular disc will be cut from a sheet of metal which will have such characteristic that the fingers, when made, will present the desired resiliency. The hole in the disc will be of greater diameter than that of the shaft which is to be sealed. The marginal portion of the flat disc will be cut to provide the fingers 12. The next step will be the forming of the shell in a forming die which will bend the fingers so they will extend in an axial direction. The cuts to form the fingers will be so made as to extend inwardly in the disc to approximately the ring portion of the shell. Thus, each entire finger will be resilient.

To the outer surface of the fingers 12 of the shell is molded a cylindrical body 13. Rubber or synthetic rubber or other suitable yieldable material that can serve as a seal may be used. The two outer edges of this body are rounded, as indicated at 14 and 15. The rounded edge 14 over the end of the fingers is such as to facilitate mounting of the seal in the cylindrical opening or bore 16 of the housing or other support 17 with which the seal is to be associated. The other rounded edge 15, which is outward of the ring portion 11 of the shell, has such a contour or radius that at least all of the surface of the body 13, which is radially outward of the rigid ring portion 11, will have a less diameter than the main outer cylindrical surface of the body 13.

The radial thickness of the body will be such as to permit the body material to be reasonably yieldable so as to make full engagement over all the bore surface of the support opening 16, even though said surface may be rough or uneven. The diameter of the outer cylindrical surface of the body will be slightly greater than the diameter of the support opening so that when the seal is inserted into operative position it will be necessary to cause the fingers to flex slightly radially inwardly to accomplish the mounting. Because the fingers are resilient, they will tend to return to normal position and this will result in an outward radial pressure (yieldable) on the inside of the body 13 and thereby maintain the cylindrical surface of the body in pressure engagement with the surface of the opening in the housing. The body 13 will not only be adhered to the outer surfaces of the fingers during molding, but rubber will also enter the space between adjacent edges of the fingers and insure greater holding action between the metal shell and the body.

The shell also will have mounted thereon a lip member 18. This lip member has a radially extending portion 19 which will be adhered to the inner surface of the ring portion 11 of the shell during a molding operation. A second annular portion 20 of the lip member extends in an axial direction from the portion 19 and is of reduced diameter, being shown as of somewhat conical shape. At the outer end of this portion 20 is a radially outwardly extending ridge or rib 21. After molding the outer end of this lip member it is so cut or trimmed to provide the end surface 22, having such relation to the inner surface of the portion 20 as to establish an annular V-shaped sealing ridge or lip 23. This lip has an inner diameter slightly less than the diameter of the shaft S with which it is to engage to thereby provide a sealing action, yet allow the shaft to have free rotation. When the seal is installed on the shaft, as shown in Figure 1, the lip will have pressure engagement with the shaft surface and will follow the shaft in any of its eccentric movements, due to the lip being at the outer end of the portion 20. In the event pressure engagement of the lip with the shaft surface should not be great enough, an annular garter spring 24 can be positioned in surrounding relation to the portion 20. This garter spring will be held in place by the rib 21 and the position of the spring will be radially outward of the sealing lip so as to apply pressure directly to the lip.

The mounting, operation and function of my improved seal is believed to be apparent from the foregoing. However, it is to be particularly noted that the seal is easy to install and remove and when installed is very efficient in establishing a seal for a shaft, not only at the shaft surface, but also at the housing. The spring fingers with the rubber body thereon permit easy "press-in" installation. The entire body 13 of rubber or synthetic rubber which engages the housing opening has a yieldable backing, because of the fingers. This permits greater tolerances in manufacture and further insures snug fit for housing openings which may have wide tolerances in manufacture. The spring fingers not only flex to permit easy installation, but insure at all times that the body will be pressed radially outward into engagement with the surface of the housing opening. The rounded edge 15 insures that all parts of the body which engage the surface of the housing opening will have yieldable backing. There will be no appreciable flow of the rubber body when the seal is installed, since there is no rigid backing given to the body, as would be the case if the spring fingers were replaced by a continuous band or flange, as is done in some seals. Also, with the spring fingers as a yieldable backing, there will be little tendency of the rubber of the body to take a "set." If some "set" does occur, the action of the spring fingers to flex radially outwardly to regain normal position will take up the "set." The fingers permit better adhering of the rubber to the shell and it is not necessary to embed the shell in rubber. With the rubber adhered only to the outer surface, and not the inner surface of the fingers, a saving in rubber cost results.

In the seal shown in Figures 4 and 5 the shell 25 has a flat ring portion 26 from the peripheral portion of which extend in an axial direction the integral spring fingers 27. Molded to these spring fingers is the cylindrical body 28 of rubber, synthetic rubber or equivalent material so that the seal can be press mounted in the housing bore in the same manner as the seal of Figures 1 to 3 and be held therein by the flexed condition of the spring fingers. The structure so far described is identical with that shown in Figures 1 to 3.

The inner part of the ring portion 26 has extending therefrom in an axial direction a cylindrical flange 29. The spring fingers and flange 29 extend in the same direction, but the flange is somewhat shorter than the fingers, as shown. The shell with the flat ring portion 26, the spring fingers 27 and the cylindrical flange 29 thus have a U-shaped radial cross section with the fingers 27 and flange 29 forming the leg portions thereof.

On the inner surface of the flange or leg portion 29 is molded an annular lip member 30 of rubber, synthetic rubber or equivalent material. This member has a portion 31 covering the entire inner surface of the flange and another reduced sleeve portion 32 extending axially beyond the end of the flange which is formed to present at its end the sealing lip 33 for engaging the shaft.

Mounted on the outer surface of the flange 29 in telescoping relation is a metal sleeve or band 34 of such axial width as to extend to a point slightly beyond the lip 33 and at this end it is provided with a flange 35 inturned to extend toward the shaft. The sleeve or band with its flange thus provides means on the seal for holding a garter spring 36 in proper surrounding position on the reduced sleeve portion 32 so as to overlie the lip and apply a contracting pressure thereto and thus give to the lip better sealing action over a longer period of time.

The operation of the seal shown in Figures 4 and 5 is the same as that of the seal shown in Figures 1 to 3. Both seals have a press mounting in the housing bore and are held therein by spring finger action. In the seal of Figures 4 and 5 the shell is of slightly different shape to permit the lip member to be adhered thereto in a different manner so that means separate from the lip member can be provided to hold a garter spring so as to act efficiently on the lip. The member which holds the garter spring in position on the conical surface overlying the lip can be easily and firmly mounted on the shell flange to which the lip member is molded.

Being aware of the possibility of modifications in the seal structures disclosed, and particularly the manner in which the yieldable backing for the rubber body can be obtained, all without departing from the fundamental principles of my invention, I desire it to be understood that the scope of the invention is not to be limited except in accordance with the terms of the appended claims or equivalents.

What is claimed is:

1. A seal for use between a housing bore and a rotatable shaft extending therethrough, said seal comprising an annular metallic shell of U- shaped radial cross section with the leg portions thereof extending axially in the same direction, the outer leg portion being formed to provide circumferentially arranged resilient fingers, a cylindrical body of rubber molded on the fingers and having an outer surface diameter slightly greater than the bore, said fingers flexing radially inwardly to permit press mounting of the seal and after mounting maintaining the seal in a non-rotative pressure engagement with the bore surface due to their flexed condition, an annular rubber member separate from the cylindrical body and being adhered only to the inner leg and having an extending reduced portion provided with a lip for sealing engagement with the shaft, said lip extending axially beyond the outer end of the inner leg.

2. A seal for use between a member having a cylindrical bore and a shaft extending therethrough and between which there is relative rotation without any appreciable axial movement, said seal comprising a metallic shell having a shell body at right angles to the shaft and also having along its outer periphery only integral axially extending resilient fingers circumferentially arranged and being normally at right angles to the plane of the shell body to thereby provide a cylindrical annular resilient structure capable of flexing radially inwardly, an annular body of yieldable material moulded on and in overlying relation to the outer surface of the resilient fingers, the outer surface of said annular body being normally cylindrical and having a diameter slightly larger than that of the bore with which the seal is to engage and said outer surface of said annular body being backed by the resilient fingers so that a slight inward flexure of the resilient fingers will permit the annular body to be easily press mounted into the bore without appreciable deforming flow thereof and the annular body to be maintained in non-movable pressure engagement with the bore by the flexed condition of the resilient structure, and other annular yieldable material mounted on the shell body and surrounding the shaft and being provided with a sealing lip unsupported radially by any part of the shell and formed to have pressure engagement with the shaft, said last named yieldable material engaging the shaft independently of any action by the resilient fingers of the shell.

References Cited in the file of this patent

UNITED STATES PATENTS

| Number | Name | Date |
|---|---|---|
| 2,088,703 | Hubbard et al. | Aug. 3, 1937 |
| 2,089,461 | Winter | Aug. 10, 1937 |
| 2,092,237 | Antonelli et al. | Sept. 7, 1937 |
| 2,145,928 | Heinze et al. | Feb. 7, 1939 |
| 2,165,052 | Hering | July 4, 1939 |
| 2,202,206 | Johnson | May 28, 1940 |
| 2,208,482 | Victor | July 16, 1940 |
| 2,249,141 | Johnson | July 15, 1941 |
| 2,434,484 | Chambers | Jan. 13, 1948 |
| 2,467,049 | Peterson | Apr. 12, 1949 |

FOREIGN PATENTS

| Number | Country | Date |
|---|---|---|
| 479,743 | Great Britain | of 1938 |
| 541,336 | Great Britain | of 1941 |
| 544,904 | Great Britain | Apr. 12, 1949 |
| 551,152 | Great Britain | of 1943 |